United States Patent
Berkelhammer et al.

[15] 3,666,860
[45] May 30, 1972

[54] SUBSTITUTED NITROIMIDAZOLYLTHIADIAZOLES AND OXADIAZOLES AS ANTIPROTOZOAL AGENTS

[72] Inventors: Gerald Berkelhammer, 147 Laurel Road, Princeton, N.J. 08540; Goro Asato, Maddock Road, R.D. 1, Box 299C, Titusville, N.J. 08560

[22] Filed: Apr. 22, 1970

[21] Appl. No.: 30,944

Related U.S. Application Data

[63] Continuation-in-part of Ser. No. 814,160, Apr. 7, 1969, abandoned, which is a continuation-in-part of Ser. No. 659,596, Aug. 10, 1967, Pat. No. 3,452,035, which is a continuation-in-part of Ser. No. 604,158, Dec. 23, 1966, abandoned.

[52] U.S. Cl. ..............................424/270, 424/250, 424/272
[51] Int. Cl. .........................................................A61k 27/00
[58] Field of Search ..........................424/250, 270, 272, 293

[56] References Cited

UNITED STATES PATENTS 3,025,303   3/1962   Ifversen et al. .....................260/306.8

Primary Examiner—Albert T. Meyers
Assistant Examiner—Frederick E. Waddell
Attorney—Ernest Y. Miller

[57] ABSTRACT

The use of substituted nitroimidazolyl-thiadiazoles and oxadiazoles are described along with methods of administration of the same. These compounds have been found useful in controlling protozoa and therefore, are antiprotozoal agents.

10 Claims, No Drawings

SUBSTITUTED NITROIMIDAZOLYLTHIADIAZOLES AND OXADIAZOLES AS ANTIPROTOZOAL AGENTS

The present invention is a continuation-in-part of our application Ser. No. 814,160, filed Apr. 7, 1969, now abandoned which is a continuation-of application Ser. No. 659,596, filed Aug. 10, 1967, now U.S. Pat. No. 3,452,035, which in turn is a continuation-in-part of our application Ser. No. 604,158, filed Dec. 23, 1966, now abandoned.

BACKGROUND OF THE INVENTION

The present invention describes the use and method of administration of compounds which are both highly effective at relatively low concentrations against a broad spectrum of protozoa, and additionally provide a relatively satisfactory margin of safety. The compositions containing substituted imidazolyl compounds of the present invention are at least five to 10 times more active than certain distantly related imidazolyl compounds of the prior art, providing effectiveness at relatively low concentrations, as well as satisfactory margins of safety.

Imidazolyl compounds in which the heterocyclic rings are joined by a methyleneamino bridge have been prepared and found to have some antiprotozoal activity; however, such compounds have not been entirely satisfactory for these purposes. The concentration at which such compounds are active is generally much higher than the desirable level; therefore, said compounds do not provide a satisfactory margin of safety. Illustrative of said compounds which have been prepared and found to have such activity are, for example, 3-[(1-methyl-5-nitro-2-imidazolyl-methylene)amino]-2-oxazolidinone and 1-[(1-methyl-5-nitro-2-imidazolylmethylene)amino]-2-imidazolidinone.

SUMMARY OF THE INVENTION

The subject matter of the present invention relates to compositions containing as the active component 1-substituted-5-nitro-2-imidazolyl compounds and an edible carrier. More particularly, the invention relates to compositions containing compounds having the following general formula:

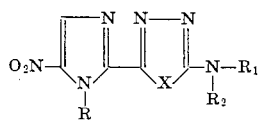

wherein R is selected from the group consisting of lower alkyl, hydroxy lower alkyl, lower alkanoyloxy lower alkyl and benzyl; X is selected from the group consisting of oxygen and sulfur; and $R_1$ and $R_2$ are selected from the group consisting of hydrogen, benzyl, alkyl of one to eight carbon atoms, halophenyl lower alkyl, allyl, hydroxy lower alkyl, morpholino lower alkyl, lower alkoxy lower alkyl, cyclohexyl, formyl, lower alkanoyl, monohalo-lower alkanoyl, dihalolower alkanoyl, 4-lower carbalkoxypipera- zinylacetyl, 1-lower alkylpiperidyl, morpholino lower alkanoyl, lower alkyl aminolower alkyl, diloweralkyl aminolower alkyl;

taken together is selected from the group consisting of -N = CHN (lower alkyl)$_2$, 1-imidazolyl, piperazinyl, N-lower alkylpiperazinyl, N-hydroxy lower alkylpiperazinyl, N-(N', N'-dilower-alkylamino)lower alkylpiperazinyl, N-pyridylpiperazinyl, N-thiazolylpiperazinyl, N-lower alkoxycarbonyl piperazinyl, piperidino, hydroxypiperidino, 1-pyrrolidinyl, morpholino, dilower alkylamino lower alkylpiperidino; and physiologically acceptable salts thereof. The term "lower alkyl" as employed in the instant specification and claims is intended to include either straight or branched chain having from one to four carbon atoms. The term halogen is intended to include chlorine, bromine, iodine and fluorine. Physiologically acceptable salts can be, for example, hydrochloride, sulfate, succinate, maleate, mucate, phosphate and the like. The invention relates to a method of inhibiting the growth of protozoa in a warm-blooded animal host which comprises administering to the animal therapeutically effective quantities of the above compounds and thereby alleviating diseases, as well as composition of matter comprising said compounds and an edible carrier.

The compounds of the present invention are effective against infections caused by Trichomonas vaginalis, Eimeria tenella, Histomonas meleagridis, Eimeria maxima, Eimeria brunetti, Eimeria necatrix, Trypanosoma cruzi, Trypanosoma equiperdum and ameba.

PREPARATION OF SUBSTITUTED IMIDAZOLYLS OF THE PRESENT INVENTION

In many instances the substituted imidazolyl compounds comprising the active component of the present compositions are prepared by oxidative cyclization of various thiosemicarbazones and semicarbazones of 1-substituted-5-nitro-2-imidazole-carboxaldehyde. Suitable oxidizing agents for such cyclization of the thiosemicarbazone to aminothiadiazoles include a wide variety of ferric salts such as ferric ammonium sulfate, ferric chloride, ferric nitrate, ferric acetate, sodium ferricyanide, sodium ferric oxalate, potassium ferric sulfate, and the like. The cyclizations of the semicarbazones to aminooxadiazoles are generally carried out with such agents as sodium hypobromite, sodium hypoiodite, and bromine with sodium acetate. The reactions are generally carried out at an elevated temperature between 50° and 150° C., depending on the particular moiety being prepared.

A number of the 2-(2-substituted amino-5-thiadiazolyl)-1-substituted-5-nitroimidazoles can be prepared by the reaction of 2-(2-halo-5-thiadiazolyl)-1-substituted-5-nitroimidazoles with the appropriate primary or secondary amines in an organic solvent, either in the presence of excess amine or with the use of other acid acceptors, as for example, aqueous sodium bicarbonate solution, usually at between 25° and 125° C.

In the preparation of active components having the above general formula wherein R represents a hydroxy lower alkyl group, it is often practical to first synthesize the corresponding ester, as for example, a compound of the formula:

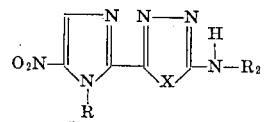

wherein R is lower alkanoyloxy lower alkyl and X and $R_2$ are as defined hereinabove, and then treat the thus formed ester with a strong mineral acid followed by pH adjustment to above about pH 7, thereby yielding the desired product. In many cases, it is found that the conditions used for cyclization 1-(2-lower alkanoyloxy lower alkyl)-5-nitro-2-imidazole carboxaldehyde thiosemicarbazones are sufficiently acidic to give rise directly to the 2-(2-amino-5-thiadiazolyl)-1-(hydroxy lower alkyl)-5-nitroimidazoles.

Where it is desired to prepare the 2-(2-formamido-5-thiadiazolyl)-1-substituted-nitroimidazole, or the 2-(2-acylamino-or 2-haloacylamino-5-thiadiazolyl)-1-substituted-5-nitroimidazole, it is practical to first synthesize the 2-(2-amino-5-thiadiazolyl)-1-substituted-5-nitroimidazole, and then treat the product with formic acid, in the case of the preparation of the 2-(2-formamido-5-thiadiazolyl)-1-substituted-5 -nitroimidazole or with an anhydride of the formula (lower alkanoyl)$_2$ or (halo lower alkanoyl)$_2$ or with the appropriate acid chloride in the instance of the preparation of the 2-(2-acylamino or 2-haloacylamino-5-thiadiazolyl)-1-substituted-5-nitromidazole. Similar reactions can be carried out to give the corresponding oxadiazolyl compounds. These reactions are usually carried out at an elevated temperature, particularly at temperatures between 50° and 150° C.

The 2-(2-amino-5-thiadiazolyl)-1-lower alkanoyloxy lower alkyl-5-nitroimidazoles and the corresponding oxadiazolyl compounds, active components of the present compositions, can be made by esterifying the 2-(2-amino-5-thiadiazolyl or 5-oxadiazolyl)-1-hydroxy lower alkyl-5-nitromidazoles by heating with an aliphatic acid in the presence of a mineral acid catalyst. If, instead, an aliphatic acid anhydride is employed, the products are 2-(2-lower alkanoylamino-5-thiadiazolyl or 5-oxidazolyl)-1-lower alkanoyl lower alkyl-5-nitroimidazoles. In the latter case, a catalyst is usually not necessary. In both instances, reaction temperatures of from 50° to 150° C. are frequently employed.

For the preparation of N,N-dilower alkyl-N'-[5-(1-substituted-5-nitro-2-imidazolyl)thiadiazol-2-yl]formamidines, products of the reaction of N,N-dilower alkyl formamides with phosgene, phosphorus oxychloride, or thionyl chloride are reacted with 2-(2-amino-5-thiadiazolyl)-1-substituted 5-nitroimidazoles in an organic solvent, as for example, in an excess of the N,N-dilower alkyl formamide, usually at the ambient temperature.

The active components of the compositions of the instant invention are highly effective in controlling protozoal infections in a warm-blooded animal host; said active components may be administered to the warm-blooded animals in admixture with their feed or drinking water. Furthermore, the compositions may be administered in the form of tablets, pills, capsules or the like, or parenterally by injection either intramuscularly or subcutaneously. The concentration employed in feed or water may be in the range of from 5 to 1,000 parts per million, preferably 15 to 500 parts per million; the most preferred concentration being about 50 to 200 parts per million. When administered parenterally, generally about 2.0 to 30 mg./kg. and preferably 5 to 20 mg./kg. of body weight provides effective disease control. The above compositions have demonstrated effectiveness against Salmonella infections when the active component was administered in as little as 0.025 percent concentration in the diet of chicks and mice. Furthermore, the active components of the present compositions have shown significant control of *Trichomonas vaginalis* and amebiasis in warm-blooded animals such as mice and rats when administered at approximately 6 to 18 mg. per kg. of body weight in a single oral dose or in feed. In addition, some of the active components provide 100 percent control of *Escherichia coli* infections in chicks when administered at about 40 mg. per kg. of body weight in a single oral dose. The present compositions show good anticoccidial activity when administered at from about 5.0 ppm to 250 ppm in the diet and are particularly effective against *Eimeria tenella*, *Eimeria brunetti*, *Eimeria maxima* and *Eimeria necatrix* as shown hereinafter. On a mg./kg basis this range is equivalent to about 0.6 to 30 mg./kg.

DETAILED DESCRIPTION

The following examples are provided for illustrative purposes and may include particular features of the invention; however, the examples should not be construed as limiting the invention, many variations of which are possible without departing from the spirit or scope thereof. Parts are by weight unless otherwise indicated.

EXAMPLE 1

Preparation of 2-(2-Amino-5-thiadiazolyl)-1-methyl-5-nitroimidazole

A mixture of 4.71 gm., 0.03 mole, of 1-methyl-2-hydroxymethyl-5-nitroimidazole, and 13.3 gm., 0.03 mole, of lead tetraacetate in 200 ml. of benzene, is refluxed while stirring magnetically for about 18 hours, cooled and filtered. The filtrate is washed with 50 ml. of saturated sodium carbonate solution. The organic phase is then separated, and the aqueous phase extracted twice with 30 ml. of chloroform. The combined organic phase is then dried over magnesium sulfate. After filtering and evaporating the organic phase to dryness, the filtrate gives 4.2 gm. of pale yellow 1-methyl-5-nitro-2-imidazolecarboxaldehyde, which is dissolved in 25 ml. of hot ethanol, then added to 2.5 gm. of thiosemicarbazide in 20 ml. of boiling ethanol containing two drops of concentrated hydrochloric acid. The mixture is then boiled for a few minutes with stirring, cooled and bright yellow crystals of the thiosemicarbazone of the above aldehyde are collected. The process yields 5.3 g., which constitutes a 77.4% overall yield, said material having a melting point of 227° C. (decomposition).

To 25 ml. of hot water containing 5.7 gm., of ferric ammonium sulfate dodecahydrate, 2.68 gm. of the above thiosemicarbazone is added, and the mixture is stirred magnetically in a boiling water bath. After 1 hour, an additional 75 ml. of hot water containing 17.1 gm. of ferric ammonium sulfate dodecahydrate is added to the above mixture. The mixture is then heated for approximately 3 hours in a boiling water bath, and filtered while still hot, yielding orange brown crystals which are washed thoroughly with hot water. The yield is 2.7 gm., having a melting point of from 259° to 260° C. (decomposition). This product is dissolved in about 20 ml. of hot dimethylformamide, filtered and the warm filtrate poured on ice. The precipitated product is washed thoroughly first with water, and then cold acetone, giving a yellow product which is dried in vacuo at 100° C. for several hours. The purified product weighs 1.55 gm., and has a melting point of from 268° to 270° C. (decomposition). The product is then submitted to analysis; calculating for carbon, hydrogen, nitrogen and sulfur, the actual values agreed closely with the theoretical values.

EXAMPLE 2

Preparation of 2-(2-Methylamino-5-thiadiazolyl)-1-methyl-5-nitroimidazole

A suspension of 20 gm. of ferric ammonium sulfate dodecahydrate in 100 ml. of water is warmed on a steam bath until the solid is completely dissolved. To the above solution 9.6 gm. 0.039 mole, of 1-methyl-5-nitro-2-imidazolecarboxaldehyde-4'-methyl-3'-thiosemicarbazone is added, and stirred on the steam bath for an additional 90 minutes. A warm solution containing 59 gm., 0.122 mole of ferric ammonium sulfate dodecahydrate in 300 ml. of water is added to the above mixture. The mixture is stirred on the steam bath for an additional 2 hours and filtered. The precipitate is washed with water and acetone to give 6.9 gm. of a yellow solid having a melting point of from 230° to 238° C. Recrystallization from 700 ml. of hot ethyl acetate gives 3.3 gm. of bright yellow needles having a melting point of 238° C.

EXAMPLE 3

Preparation of 2-(2-Dimethylamino-5-thiadiazolyl)-1-methyl-5-nitroimidazole

A mixture of 14.1 gm., 0.1 mole, of 1,2-dimethyl-5-nitroimidazole, 12 gm., 0.1 mole, of selenium dioxide and 100 ml. of diethyleneglycol dimethyl ether is refluxed while stirring magnetically for approximately 4 hours. The mixture is then cooled and filtered through a layer of diatomaceous earth into a warm solution of 11.5 gm., 0.1 mole of 4',4'-dimethyl-3'-thiosemicarbazide in 50 ml. of water and 10 ml. of glacial acetic acid. A precipitate forms immediately. The mixture is cooled and and filtered to give 7.5 gm. of yellow crystals, which have a melting point of from 205° to 210° C. The crystals are recrystallized twice from methyl cellosolve and once from ethanol, to give 1.3 gm. of orange needles having a melting point of from 208° to 210° C. (decomposition).

A warm suspension of 9.2 gm. of 1-methyl-5-nitro-2-imidazolecarboxaldehyde 4',4'-dimethyl-3'-thiosemicarbazone (prepared above in 100 ml. of water is added to a warm solution of 69.4 gm. of ferric ammonium sulfate dodecahydrate in 400 ml. of water. The mixture is magnetically stirred on a steam bath for approximately 4 hours, and filtered. The precipitate is washed with water and acetone giving 8.6 gm. of a brown solid having a melting point of from 238° to 240° C. (decomposition). Two recrystallizations from N,N-dimethylformamide gives 3.6 gm. of yellow crystals having a melting point of 252° C.

EXAMPLE 4

Preparation of 2-(2-Ethylamino-5-thiadiazolyl)1-methyl-5-nitroimidazole and 2-(2-Dimethylamino-5-thiadiazolyl)-1-ethyl-5-nitroimidazole The ethylamino compound is prepared by employing the procedure set forth in Example 1, with the exception that ethyl-thiosemicarbazide is substituted for thiosemicarbazide. The compound melts at 214°–216° C.

With regard to the dimethylamino compound, said compound is prepared by employing the procedure set forth in Example 3, with the exception that 1-ethyl-2-methyl-5-nitroimidazole is utilized instead of 1,2-dimethyl-5-nitroimidazole. The process yields 1-ethyl-5-nitro-2-imidazolecarboxaldehyde, 4',4'-dimethyl-3'-thiosemicarbazone, which is cyclized as in Example 3 to 2-(2-dimethylamino-5-thiadiazolyl)-1-ethyl-5-nitroimidazole.

EXAMPLE 5

Preparation of 2-(2-Foramamido-5-thiadiazolyl)-1-methyl-5-nitroimidazole

The above compound is prepared by refluxing 8 gm. of 2-(2-amino-5-thiadiazolyl)-1-methyl-5-nitroimidazole in 30 ml. of 98 percent formic acid for 10 hours, cooling, and adding the mixtures to saturated sodium bicarbonate solution, and the solid collected. The compound melts at 225° to 227° C.

EXAMPLE 6

Preparation of 2-(2-Acetamido-5-thiadiazolyl)-1-methyl-5-nitroimidazole

The above compound is prepared by heating under reflux for 30 minutes a mixture of 14 gm. of 2-(2-amino-5-thiadiazolyl)-1-methyl-5-nitroimidazole in 280 ml. of acetic anhydride. The mixture is evaporated to dryness, and the solid residue is washed thoroughly with ether giving 16.4 gm. of a yellow solid having a melting point of 235° C. (decomposition).

EXAMPLE 7

Preparation of 1-(2-Acetoxyehtyl)-5-nitro-2-imidazolecarboxaldehyde

A 6.27 gm. portion of 1-(2-acetoxyethyl)-2-hydroxymethyl-5-nitroimidazole is refluxed with 13.3 gm. of lead tetraacetate in 200 ml. of benzene for 18 hours, cooled, and filtered. The filtrate is washed with 50 ml. of saturated sodium carbonate solution, and the organic phase is separated therefrom. The remaining aqueous phase is twice extracted with 30 ml. of chloroform, and then combined with the above separated organic phase. The combined organic phases are dried under magnesium sulfate, and filtered. The organic solvents are then removed in vacuo, giving the above aldehyde.

EXAMPLE 8

Preparation of 2-(2-Amino-5-thiadiazolyl)-1-(2-hydroxyethyl)-5-nitroimidazole

A 14.25 g. sample of the aldehyde prepared in Example 7 is treated with 5.72 g. of thiosemicarbazide in 150 ml. of 95 percent ethanol containing a drop of concentrated hydrochloric acid and the mixture is heated on a steam bath for 20 minutes. The hot solution is filtered to remove insoluble materials, cooled and the yellow-brown crystals are collected. The yield of 1-(2-acetoxyethyl)-5-nitro-2-imidazolecarboxaldehyde thiosemicarbazone os 18.8 g. after drying in a vacuum oven at 60° for 2½ hours. Recrystallization of the product gives a yellow solid, melting point 181°–183.5° C.

The thiosemicarbazone (12 g.) is added to 77 g. of ferric ammonium sulfate dodecahydrate in 500 ml. of water at 60° and the mixture is heated to 90°–100° for 4 hours. The mixture is cooled, the solid collected and washed with water. Only 0.92 g. (melting point 249°–251°) of product is soluble in a large volume of acetone. The remaining product is dissolved in 150 ml. of dimethylformamide, filtered and the filtrate evaporated to dryness to give a solid. This solid is treated with about 20 ml. of acetone, slurried, cooled and collected to give yellow crystals. After drying in an air stream overnight, 5.5 g. (melting point 253.5°–255°) of 2-(2-amino-5-thiadiazolyl)-1-(2-hydroxyethyl)-5-nitroimidazole is obtained; no carbonyl absorption band is present in the infrared spectrum. Thus, it is not necessary to perform a separate hydrolysis step for the removal of the acetyl group.

EXAMPLE 9

Preparation of 2-(2 -Dichloroacetamido-5-thiadiazolyl)-1-methyl-5-nitroimidazole Five grams of 2-amino-5-(1-methyl-5-nitro-2-imidazolyl)-1,3,4-thiadiazole is added to 25 ml. of dichloroacetic anhydride and the mixture boiled gently for a few minutes. After standing at room temperature for four hours, 200 ml. of diethyl ether is added, and the mixture stored at −10° C. overnight. The solid is collected, dried, and recrystallized from a mixture of 300 ml. of ethanol and 50 ml. of 2-methoxyethanol to yield 4.5 g. of pure product melting at 246°–247° C.

EXAMPLE 10

Preparation of 2-(2-Amino-5-oxadiazolyl)-1-methyl-5-nitroimidazole

Method A

In 180 ml. of hot water, 9.3 grams (0.06 mole) of 1-methyl-5-nitro-2-imidazolecarboxaldehyde is slurried while 6.7 grams (0.06 mole) of semicarbazide hydrochloride is added portionwise. After 15 minutes of heating, the mixture is cooled in a refrigerator overnight. The solid is then collected and washed with water and methanol, respectively, to give a yellow product, melting point 272°–273° C. (dec.). After drying at 100° for 2 hours under reduced pressure, 11.94 grams of 1-methyl-5-nitro-2-imidazolecarboxaldehyde semicarbazone is obtained. This semi-carbazone (6.35 grams or 0.03 mole) is added to 10 grams of anhydrous sodium acetate in 50 ml. of glacial acetic acid and 1.25 ml. of bromine is added with continuous stirring. The mixture is heated gradually to give a nearly clear red solution at 50° C. which becomes increasingly turbid with time. After heating at 75 ± 3° for 3 hours, the mixture is cooled and poured on ice. The yellow solid is collected, washed with water, then with methanol, and dried under reduced pressure at 70° C. for 3 hours to give 5 grams of crude 2-amino-5-(-methyl-5-nitro-2-imidazolyl)-oxadiazole, melting point 284°–287° C. (dec.). This material is dissolved in boiling dimethylformamide, ethanol added, and the mixture cooled to give yellow crystals, melting point 291°–293° C. (dec.).

METHOD B

In 25 ml. of methanol, 0.93 grams (5 mmole) of 1-methyl-5-nitro22-imidazolecarboxylic acid hydrazide and 0.53 grams (5 mmole) of cyanogen bromide are refluxed for 2 hours, cooled, and poured on ice to give a pale yellow solid. This solid is collected, washed with water, and dried under reduced pressure at 100° C. for 2 hours to give 0.65 grams, melting point 286°–288° C. (dec.), of 2-amino-5-(1-methyl-5-nitro-2-imidazolyl)oxadiazole.

EXAMPLE 11

Preparation of 2-(2-Methylamino-5-oxadiazolyl)-1-methyl-5-nitroimidazole

To a solution of 8.5 grams (0.055 mole) of 1-methyl-5-nitro-2-imidazolecarboxaldehyde in 50 ml. of ethanol is added a solution of 5.0 grams (0.056 mole) of 4-methylsemicarbazide in 25 ml. of ethanol and 10 ml. of water containing 2–4 drops of concentrated hydrochloric acid. The resulting solution is heated at 60°–70° C. until a yellow solid starts to separate and then stored at 0° C. for 1 hour; 12.2 grams (98 percent) of 1-methyl-5-nitro-2-imidazolecarboxaldehyde-4-methylsemicarbazone is obtained melting at 221°–223° C.

Seven grams (0.031 mole) of 1-methyl-5-nitro-2-imidazolecarboxaldehyde-4-methylsemicarbazone is dissolved in 85 ml. of glacial acetic acid, 16 grams of anhydrous sodium acetate added, and a solution of 2.5 ml. of bromine in 20 ml. of glacial acetic acid added. The resulting mixture becomes a clear solution as it is heated at 70°–80° C. for 2–4 hours. The solvent is evaporated under reduced pressure and the residue treated with shaved ice until a yellow suspension is obtained. The product is collected, washed with cold water, methanol, and finally with ether. Recrystallization from ethanol containing N,N-dimethylformamide affords 2.7 grams (39 percent) of a yellow product melting at 239°–241° C. In another preparation, a 63 percent yield of product melting at 237°–239° C. is obtained without recrystallization.

EXAMPLE 12

Preparation of 2-(2-Dimethylamino-5-oxadiazolyl)-1-methyl-5-nitroimidazole

A solution of 780 mg. (5 millimoles) of 1-methyl-5-nitro-2-imidazolecarboxaldehyde in 10 ml. 95 percent of ethanol is treated with 520 mg. (5 millimoles) of 4,4-dimethylsemicarbazide and one drop of concentrated hydrochloric acid to give a yellow solid. The mixture is heated at 40° C. for 5 minutes, cooled to 0° C., and 1,180 mg. (98 percent) of crystalline 1-methyl-5-nitro-2-imidazolecarboxaldehyde 4,4-dimethylsemicarbazone is obtained. Recrystallization from ethanol containing N,N-dimethylformamide affords 900 mg. (74 percent) of material melting at 206°–208° C.

The procedure of Method A of Example 10 is followed except that 7.5 grams (0.31 mole) of 1-methyl-5-nitro-2-imidazolecarboxaldehyde 4,4-dimethylsemicarbazone, prepared above, is used. The product is recrystallized from ethanol to give 5.2 grams (69 percent) of material melting at 180°–182° C.

EXAMPLE 13

Preparation of 2-(2-Acetamide-5-oxadiazolyl)-1-methyl-5-nitroimidazole

Four grams of acetyl chloride are slowly added to 3.6 grams (0.017 mole) of 2-(2-amino-5-oxadiazolyl)-1-methyl-5-nitroimidazole suspended in a mixture of 44 ml. of pyridine and 35 ml. of benzene. The addition is completed in 30 minutes, the mixture heated at 60°–70° C. for 10 minutes, and then poured into 500 ml. of ice and water. After the resulting mixture is stirred for 1½ hours, the product separates. Recrystallization from 150 ml. of acetone containing some N,N-dimethylformamide affords 2.4 grams (56 percent) of pale yellow product. A second recrystallization from acetone gives 2.1 g. of product, melting point 224°–225° C.

EXAMPLE 14

Preparation of 2-{2-[(Dimethylaminomethylene)amino]-5-thiadiazolyl}-1-methyl-5-nitroimidazole Phosgene gas is bubbled into 100 ml. of N,N-dimethylformamide at 5°–10° C. until 2.0 g. (0.02 mole) is absorbed and a crystalline suspension is formed. This suspension is added in portions to a stirred mixture of 4.5 g. (0.02 mole) of 2-(2-amino-5-thiadiazolyl)-1-methyl-5-nitroimidazole and 100 ml. of N,N-dimethylformamide at 25° C. After 30 minutes the reaction mixture is diluted with 200 ml. of diethyl ether, and the pale yellow solid is collected, washed with ether, and dried. Treatment of this material with 150 ml. of water and drying affords 5.0 g. (89 percent) of brilliant yellow solid melting at 230°–232° C.

EXAMPLE 15

Preparation of 2-[2-(4-Carbethoxy-1-piperazinyl)-5-thiadiazolyl]-1-methyl-5-nitroimidazole The compound 1-methyl-5-nitro-2-imidazole carboxaldehyde-4-carbethoxy-1-piperazine thiocarbohydrazone is prepared by the procedure of Example 3, 23.2 gm., 0.1 mole, of 4-carbethoxypiperazine-1-thiocarbohydrazide replacing the 4,4-dimethyl-3-thiosemicarbazide. The yield is 8.6 gm. and the melting point 182°–183° C.

A suspension of 6.4 gm., 0.0174 mole, of 1-methyl-5-nitro-2-imidazolecarboxaldehyde-4-carbethoxy-1-piperazine thiocarbohydrazone (prepared above) in 200 ml. of boiling ethanol is stirred as a solution of 35 mg. of ferric ammonium sulfate dodecahydrate in 200 ml. of hot water is added in one portion. A deep red-brown solution results. After stirring and heating on the steam bath for 4 hours, a precipitate is present. This is collected, washed with water, dried and recrystallized from hot ethanol to give 3.6 grams of the title compound melting at 179°–181° C.

EXAMPLE 16

Preparation of 2-[2-(Hydroxyethylamino)-5-thiadiazolyl]-1-methyl-5-nitroimidazole A solution of 1.3 gm., 0.0058 mole, of 2-(2-amino-5-thiadiazolyl)-1-methyl-5-nitroimidazole is dissolved in 25 ml. of concentrated hydrochloric acid, cooled to 5° C., stirred, and treated during 5 minutes with a solution of 0.5 gm., 0.0073 mole, of sodium nitrite in 2 ml. of water. The mixture is kept at room temperature for 18 hours. The precipitate present is collected, washed with water, dried and then extracted with warm acetone. Removal of the acetone leaves a solid residue which is recrystallized from a mixture of acetone and diethylether to give 0.16 gm. of 2-(2-chloro-5-thiadiazolyl)-1-methyl-5-nitroimidazole as yellow crystals, melting at 135°–137° C.

A mixture consisting of 4.9 gm., 0.02 mole, of 2-(2-chloro-5-thiadiazolyl)-1-methyl-5-nitroimidazole, 3.0 gm., 0.05 mole, of ethanolamine, and 50 ml. of p-dioxane is stirred at room temperature for 24 hours. The precipitate is collected, washed with aqueous sodium bicarbonate solution, dried and recrystallized from methanol to give the pure compound melting at 208°–209° C. Working up the mother liquors gives additional material, the total yield being 3.4 gm.

EXAMPLE 17

Preparation of 2-[2-(3-Dimethylaminopropylamino)-5-thiadiazolyl]-1-methyl-5-nitroimidazole A mixture consisting of 3.8 gm., 0.0155 mole of 2-(2-chloro-5-thiadiazolyl)-1-methyl-5-nitroimidazole, prepared as in Example 16 2.5 gm., 0.029 mole of 3-dimethylaminopropylamine, 2.1 gm. 0.025 mole, of sodium bicarbonate and 100 ml. of benzene is refluxed for 22 hours. The reaction mixture is cooled to room temperature, washed with aqueous sodium bicarbonate and sodium chloride solutions. Cooling to 50° C. gives a crystalline precipitate which is collected and recrystallized from benzene to give the pure compound melting at 153°–154° C. More product is obtained from the mother liquors to give an overall yield of 3.0 gm.

EXAMPLE 18

Preparation of 2-(2-Amino-5-oxadiazolyl)-1-(2-hydroxyethyl)-5-nitroimidazole, 2-(2-methylamino-5-oxadiazolyl)-1-(2-hydroxyethyl)-5-nitromidazole, and 2-(2-dimethylamino-5-oxadiazolyl)-1-(2-hydroxyethyl)-5-nitroimidazole 1-(2-hydroxy)-5-nitro-2-imidazolecarboxaldehyde (1 mole) is treated with 1 mole of semicarbazide hydrochloride in ethanol to give nearly a quantitative yield of semicarbazone. The product is treated with bromine and sodium acetate in the manner described in Method A of Example 1 to give the first compound above which melts with decomposition at 228°–230° C.

The use of 4-methylsemicarbazide and 4,4-dimethylsemicarbazide hydrochlorides instead of semicarbazide hydrochloride, followed by treatment of the methylated semicarbazones with bromine and sodium acetate as above, gives, respectively, 2-(2-methylamino-5-oxadiazolyl)-1-(2-hydroxyethyl)-5-nitroimidazole, melting at 202.5°–204° C., and 2-(2-dimethylamino-5-oxadiazolyl)-1-(2-hydroxyethyl)-5-nitroimidazole, melting at 171°–173° C.

EXAMPLE 19

Preparation of 2-(2-Amino-5-thiadiazolyl)-1-(2-acetoxyethyl)-5-nitroimidazole

The sample (0.1 g.) of 2-amino-5-[1-(2-hydroxyethyl)-5-nitro-2-imidazolyl]thiadiazole is dissolved in 2 ml. of hot glacial acetic acid and a drop of concentrated sulfuric acid is added. The solution is refluxed for 45 minutes, cooled and poured on ice to give a yellow solid. This solid is collected, washed with water and dried; the yield is 0.1 g., melting point 159°–162° C. (turbid). A purified sample of the 2-amino-5-[1-(2-acetoxyethyl)-5-nitro-2-imidazolyl]thiadiazole, melts at 164°–165.5° C.

EXAMPLE 20

Preparation of 2-(2-Acetamido-5-thiadiazolyl)-1-(2-acetoxyethyl)-5-nitroimidazole The sample (0.1 g.) of 2-amino-5[1-(2-hydroxyethyl)-5-nitro-2-imidazolyl]thiadiazole is added to 1.5 ml. of acetic anhydride and heated under reflux for 20 minutes. After cooling, the mixture is evaporated to dryness to give a tan solid which is slurried with ether and collected, melting point 258°–265° C.; the yield is 0.11 g. This solid is recrystallized from acetone to give the purified product, melting point 264°–268° C.

EXAMPLE 21

Preparation of 2-(2-Amino-5-thiadiazolyl)-1-methyl-5-nitroimidazole Hydrochloride Four grams of 2-(2-amino-5-thiadiazolyl)-1-methyl-5-nitroimidazole is added to concentrated hydrochloric acid. The resultant precipitate of the hydrochloride is filtered off and air dried; melting point 249° C. with decomposition. When the hydrochloride is added to water, the free base is formed again without the necessity of using alkali.

EXAMPLE 22

Preparation of 2-(2-Hydroxymethylamino-5-thiadiazolyl)-1-methyl-5-nitroimidazole A suspension of 5 g. of 2-(2-amino-5-thiadiazolyl)-1-methyl-5-nitroimidazole in 200 ml. of 36 percent aqueous formaldehyde solution is stirred for 20 hours at room temperature. The suspension is cooled in ice, and the insoluble solid is collected by filtration and washed with acetone. The yield of the title compound is 6.15 g., melting point 177° C. with decomposition (rapid heating).

EXAMPLE 23

Preparation of 2-(2-Amino-5-thiadiazolyl)-1-ethyl-5-nitroimidazole

A slurry of β-(1-ethyl-5-nitro-2-imidazolyl)styrene (42.7 g. or 0.175 mole) in 350 ml. of methanol containing 14.6 ml. of water at 25° C. is treated with ozone until a nearly clear, pale-yellow solution is obtained. Subsequently, the mixture is treated with 42 g. of sodium iodide in 138 ml. of water and 20.3 ml. of glacial acetic acid at 25° C. The mixture is stirred for 40 minutes and 44.1 g. (0.288 mole) of sodium thiosulfate in 242 ml. of water added. The mixture is filtered, and the filtrate concentrated at 70°–75° C. under 15–20 mm. of pressure to give 450 ml. of solution. The solution is acidified with 50 ml. of 6N hydrochloric acid and the benzaldehyde removed at 70°–75 C. under 15–20 mm. of pressure. The residue is then neutralized with saturated sodium bicarbonate solution and extracted with ethyl acetate to give an 81.5 percent yield of solid aldehyde, melting point 61°–67° after stripping. A sublimed sample of the aldehyde melts at 68°–69° C. with softening at 65° C. When the aqueous ozonized solution, after benzaldehyde is removed, is treated with thiosemicarbazide and mineral acid or semicarbazide hydrochloride and heated, the 1-ethyl-5-nitro-2-imidazolecarboxaldehyde thiosemicarbazone, melting point 241° C., or semicarbazone, melting point 223°–226° C., is obtained. The compound β-(1-ethyl-5-nitro-2-imidazolyl)styrene is prepared by treating 1-ethyl-2-methyl-5-nitroimidazole with benzaldehyde in absolute ethanol and potassium tertiary butoxide in nitrogen atmosphere below 37° C. A sample purified from 95 percent ethanol melts at 136.5°–137.5° C.

A solution of 184 g. t ferric ammonium sulfate dodecahydrate in 680 ml. of water is heated to 60° C. and 23.1 g. of 1-ethyl-5-nitro-2-imidazolecarboxaldehyde thiosemicarbazone (prepared as above) is added with efficient stirring. The temperature is raised to 90° C. and vigorous stirring continued for 4 hours. The reaction mixture is cooled to 4° C. and filtered. The solid is washed with warm water and dried under vacuum at 110° C. and then extracted with 800 ml. of hot acetone, followed by three 300-ml. portions of hot acetone. Cooling the acetone gives a solid product, which is filtered off; melting point 231°–233° C. A second crop with the same melting point is obtained by evaporating the filtrate and recrystallizing the residue from acetone. The combined yield is 17.0 g. (74.5 percent).

EXAMPLE 24

Preparation of 2-(2-Amino-5-thiadiazolyl)-1-benzyl-5-nitroimidazole 0.5 g. (1.64 millimole) of β-(1-benzyl-5-nitro-2-imidazolyl)styrene in 95 percent aqueous methanol is treated with ozone until a clear solution is obtained. To this solution at 15° C., 0.312 g. (1.64millimole) of sodium meta-bisulfite ($Na_2S_2O$) in 3 ml. of water is added. The mixture is then evaporated to dryness under reduced pressure at 75° C. and the solid extracted with ethyl acetate. The ethyl acetate extracts are dried, evaporated to dryness to give a yellow-orange residue (probably bisulfite addition product) which solidifies upon standing. This material is dissolved in 20 ml. of aqueous methanol and 0.15 g. of thiosemicarbazide and a drop of 6N hydrochloric are added. After refluxing for 15 minutes and cooling, 0.25 g., melting point 193°–196° C., of 1-benzyl-5-nitro-2-imidazolecarboxaldehyde thiosemicarbazone is isolated. The use of a half of an equimolar amount of sodium meta-bisulfite affords the title aldehyde instead of the bisulfite addition product. When the ethyl acetate extract is evaporated to dryness and dissolved in 75 percent aqueous ethanol and semicarbazone is added, and the mixture is heated on a steam bath for 10 minutes, and sodium acetate is added, the semicarbazone derivative, melting point 226°–228° C. is obtained. Twelve grams of 1-benzyl-5-nitro-2-imidazolecarboxaldehyde thiosemicarbazone are added to a stirred solution of 76.2 g. of ferric ammonium sulfate dodecahydrate in 600 ml. of water at 50° C. and the slurry is heated at 90°–95° C. for 6 hours. The mixture is cooled in ice and the yellow-brown solid collected, washed with water, and dried under reduced pressure. The yield of product is 10.9 g. Recrystallization from methanol gives analytically pure material melting at 213°–215° C.

EXAMPLE 25

Preparation of 2-(2-Amino-5-oxadiazolyl)-1-ethyl-5-nitroimidazole

A slurry of 10.2 g. of 1-ethyl-5-nitro-2-imidazolecarboxaldehyde semicarbazone (prepared as in Example 23), and 15.0 g. of anhydrous sodium acetate in 75 ml. of glacial acetic acid is treated with 1.87 ml. of bromine at 81° C. under agitation. Stirring is continued at 75°–80° C. for 17½ hours, at which time workup of a sample shows starting material still present. An additional 7.5 g. of sodium acetate and 1.00 ml. of bromine are added and stirring continued for 3 hours. A final 3.85 g. of sodium acetate and 0.50 ml. of bromine are added and the reaction mixture is stirred for 1 hour at 75° C. The reaction mixture is cooled to 15° C. and poured over ice. The product is filtered off, washed with water and dried under reduced pressure. The yield is 6.3 g. and the melting point 265° with decomposition.

EXAMPLE 26

Preparation of 2-(2-Amino-5-oxadiazolyl)-1-benzyl-5-nitroimidazole

A slurry of 6.1 g. of 1-benzyl-5-nitro-2-imidazolecarboxaldehyde semicarbazone (prepared as in Example 24) and 8 g. of anhydrous sodium acetate in 40 ml. of glacial acetic acid is stirred at 40° C. while 3.4 g. of bromine in 15 ml. of acetic acid is slowly added. The mixture is heated at 65°–70° C. for 4 hours, then poured on ice and the yellow solid collected, washed with water, and dried under reduced pressure. The yield is 5.7 g. Recrystallization from acetone gives analytically pure material melting at 261.5°–262.5° C.

EXAMPLE 27

Preparation of 2-[2-(2,2-Diethoxyethylamino)-5-thiadiazolyl]-1-methyl-5-nitroimidazole A mixture composed of 9.8 g. of 2-(2-chloro-5-thiadiazolyl)-1-methyl-5-nitroimidazole, (Example 16), 11.0 g. of 2,2-diethoxyethylamine, and 250 ml. of dioxane is stirred and heated on the steam bath for 12 hours. It is then diluted with 500 ml. of cold water, cooled, and the precipitated yellow solid collected and dried. Recrystallization from 50 percent aqueous ethanol gives the pure compound melting at 154°–155° C.

EXAMPLE 28

Preparation of 2-(2-Piperidino-5-thiadiazolyl)-1-mehtyl-5-nitroimidazole

A mixture composed of 7.4 g. of 2-(2-chloro-5-thiadiazolyl)-1-methyl-5-nitroimidazole (Example 16), 6 g. of piperidine, and 200 ml. of dioxane is stirred at room temperature for 24 hours, and then taken to dryness under reduced pressure. The residue is shaken with 100 ml. of water and the insoluble portion collected and dried. Recrystallization from 150 ml. of 2-methoxyethanol gives 7.6 g. of the subject compound melting at 212°–213° C.

EXAMPLE 29

Preparation of 2-(2-n-Hexylamino-5-thiadiazolyl)-1-methyl-5-nitroimidazole

The preparation of the title compound is carried out essentially as described for the 2-piperidino derivative (Example 28), 6.5 g. of n-hexylamine replacing the piperidine. The crude product is recrystallized from 125 ml. of 2-methoxyethanol to give 5.2 g. of the pure compound melting at 146°–147° C.

EXAMPLE 30

Preparation of 2-[4-(2-Hydroxyethyl)-1-piperazinyl-5-thiadiazolyl]-1-methyl-5-nitroimidazole The preparation of the subject compound is carried out essentially as described for the 2-piperidino derivative (Example 28), 3.9 g. of 1-(2-hydroxyethyl)piperazine replacing the piperidine. After recrystallization from ethanol, 3.5 g. of pure compound is obtained, melting at 204°–206° C.

EXAMPLE 31

Preparation of 2-{2-[4-(3-Dimethylaminopropyl)-1-piperidino]-5-thiadiazolyl}-1-methyl-5-nitroimidazole The preparation of the title compound is carried out by the procedure described for the 2-piperidino derivative (Example 28), 5.1 g. of 4-(3-dimethylaminopropyl)piperidine replacing the piperidine. Recrystallization from methanol gives 5.6 g. of pure product, melting at 174°–175° C.

EXAMPLE 32

Preparation of 2-{2-[N-(2-Hydroxyethyl)methylamino]-5-thiadiazolyl}-1-methyl-5-nitroimidazole The preparation of the above compound is carried out essentially as described for the 2-piperidino derivative (Example 28), an equivalent of N-methylethanolamine replacing the piperidine. The pure compound melts at 158°–160° C. after recrystallization from methanol.

EXAMPLE 33

Preparation of 2-[2-(1-Piperazinyl)-5-thiadiazolyl]-1-methyl-5-nitroimidazole

The preparation of the subject compound is carried out essentially as described for the 2-piperidino derivative (Example 28), two equivalents of piperazine replacing the piperidine. The crude product is recrystallized from 2-methoxyethanol to yield the pure compound melting at 240°–241° C.

EXAMPLE 34

Preparation of 2-[2-(4-Methyl-1-piperazinyl)-5-thiadiazolyl]-1-methyl-5-nitroimidazole The preparation of the above compound is carried out in the manner described for the 2-piperidino derivative (Example 28), an equivalent of 1-methylpiperazine replacing the piperidine. The crude product is purified by recrystallization from 2-methoxyethanol and melts at 242°–244° C.

EXAMPLE 35

Preparation of 2-{2-[4-(3-Dimethylaminopropyl)-1-piperazinyl]-5-thiadiazolyl}-1-methyl-5-nitroimidazole A solution of 2-(2-chloro-5-thiadiazolyl)-1-methyl-5-nitroimidazole in 200 ml. of dioxane is treated with 5.1 g. of 1-(3-dimethylaminopropyl)piperazine, and the mixture stirred at room temperature for 18 hours. The precipitate is collected, dissolved in 100 ml. of water, made alkaline with sodium hydroxide solution, and then extracted with 500 ml. of chloroform. The chloroform extract is dried and the solvent removed under reduced pressure. The yellow residue is

EXAMPLE 36

Preparation of 2-{2-[4-(2-Pyridyl)-1-piperazinyl]-5-thiadiazolyl}-1-methyl-5-nitroimidazole The preparation of the above compound is carried out essentially as described for the 2-[4-(3-dimethylaminopropyl)-1-piperazinyl derivative] (Example 35), an equivalent of 1-(2-pyridyl)piperazine replacing the 1-(3-dimethylaminopropyl)piperazine. After recrystallization from 2-methoxyethanol, the pure compound melts at 280°–282° C.

EXAMPLE 37

Preparation of 2-{2-[4-(2-Thiazolyl)-1-piperazinyl]-5-thiadiazolyl}-1-methyl-5-nitroimidazole The preparation of the subject compound is carried out essentially as described for the 2-[4-(3-dimethylaminopropyl)-1-piperazinyl] derivative (Example 35), an equivalent of 1-(2-thiazolyl)piperazine replacing the 1-(3-dimethylaminopropyl)piperazine. After recrystallization from 2-methoxyethanol, the pure compound melts at 297°–300° C.

EXAMPLE 38

Preparation of 2-(2-Cyclohexylamino-5-thiadiazolyl)-1-methyl-5-nitroimidazole

A mixture of 5.0 g. of 2-(2-chloro-5-thiadiazolyl)-1-methyl-5-nitroimidazole, 6.0 g. of cyclohexylamine and 125 ml. of dioxane is stirred at reflux until thin-layer chromatographic analysis indicates that the chloro intermediate is completely utilized. The dioxane is removed under reduced pressure and the residue triturated with aqueous sodium bicarbonate solution. Recrystallization from a mixture of ethylacetate and acetone yields the pure compound melting at 215°–217° C.

EXAMPLE 39

Preparation of 2-(2-t-Butylamino-5-thiadiazolyl)-1-methyl-5-nitroimidazole

The preparation of the above compound is accomplished essentially by the procedure described for the 2-cyclohexylamino derivative (Example 38), an equivalent of t-butylamine replacing the cyclohexylamine. Recrystallization of the crude product from a mixture of ethyl acetate and acetone gives the pure compound melting at 249°–251° C.

EXAMPLE 40

Preparation of 2-(2-n-Octylamino-5-thiadiazolyl)-1methyl-5-nitroimidazole

The preparation of the above compound is carried out essentially as described for the 2-cyclohexylamino derivative (Example 38), an equivalent of n-octylamine replacing the cyclohexylamine. The crude product is purified by recrystallization from aqueous 2-methoxyethanol and then melts at 130°–132° C.

EXAMPLE 41

Preparation of 2-(2-Chloroacetamido-5-thiadiazolyl)-1-methyl-5-nitroimidazole

Twenty grams of 2-(2-amino-5-thiadiazolyl)-1-methyl-5-nitroimidazole is added in portions to a solution of 60 g. of chloroacetic anhydride in 250 ml. of dioxane at 90°–95° C. The mixture is stirred at this temperature for 3 hours. After standing at room temperature, the mixture is filtered and precipitate washed with diethyl ether and dried. Recrystallization from 2-methoxyethanol gives the pure compound, melting at 239°–240° C. with decomposition.

EXAMPLE 42

Preparation of 2-(2-Morpholinoacetamido-5-thiadiazolyl)-1-methyl-5-nitroimidazole Six grams of 2-(2-chloroacetamido-5-thiadiazolyl)-1-methyl-5-nitroimidazole (Example 41) is added to a solution of 4 grams of potassium iodide in 2 liters of anhydrous acetone, and the mixture then influxed for 2 hours. Potassium chloride precipitates from the solution. Four grams of morpholine is added and the mixture refluxed for 7 hours. The solvent is removed in a stream of air. The residual solid is slurried with 100 ml. of water, filtered, and dried. Recrystallization from 300 ml. of boiling dioxane gives 3.8 g. of the title compound, melting at 250°–252° C. with decomposition.

EXAMPLE 43

Preparation of 2-(2-Amino-5-thiazolyl)-1-propyl-5-nitroimidazole

The procedure of Example 23, with the substitution of $\beta$-(1-propyl-5-nitro-2-imidazolyl)styrene for $\beta$-(1-ethyl-5-nitro-2-imidazolyl)styrene in the first step is utilized to prepare 2-(2-amino-5-thiadiazolyl)-1-propyl-5-nitroimidazole, melting at 234.5°–236°.

EXAMPLE 44

Preparation of 2-(2-Benzylamino-5-thiadiazolyl)-1-methyl-5-nitroimidazole

A solution of 7.4 g. of 2-(2-chloro-5-thiadiazolyl)-1-methyl-5-nitroimidazole in 125 ml. of dioxane is stirred and treated with 7 grams of benzylamine. Stirring is continued at room temperature for 18 hours. The heavy precipitate is then collected, washed with 200 ml. of warm water, and dried. Recrystallization from 150 ml. of boiling 2-methoxyethanol gives 3.4 grams of the title compound, melting at 219°–221° C.

EXAMPLE 45

Preparation of 2-[2-(4-Chlorophenylethylamino)-5-thiadiazolyl]-1-methyl-5-nitroimidazole The preparation of the title compound is carried out essentially as described in Example 28 for the 2-piperidino derivative, 7.5 g. of 4-chlorophenyl-ethylamine replacing the piperidine. The crude product is recrystallized from 150 ml. of 2-methoxyethanol to give 6.5 g. of the pure compound melting at 180°–181° C.

EXAMPLE 46

Preparation of 2-(2-Allylamino-5-thiadiazolyl)-1-methyl-5-nitroimidazole

The preparation of the above compound is carried out essentially as described for the 2-piperidino derivative in Example 28, 4.0 g. of allylamine replacing the piperidine. The crude product is recrystallized from 400 ml. of ethanol plus 25 ml. of acetone to give 5.3 g. of the pure compound melting at 211°–212° C.

EXAMPLE 47

Preparation of 2-[2-(1-pyrrolidinyl)-5-thiadiazolyl]-1-methyl-5-nitroimidazole

The preparation of the title compound is carried out essentially as described for the 2-piperidino derivative in Example 28 5.0 g. of pyrrolidine replacing the piperidine. The crude product is recrystallized from 400 ml. of 2-methoxyethanol to give 6.2 g. of the pure compound melting at 258°–260° C.

EXAMPLE 48

Preparation of 2-[2-(4-Hydroxypiperidino)-5-thiadiazolyl]-1-methyl-5-nitroimidazole The preparation of the above compound is carried out essentially as described for the 2-piperidino derivative in Example 28, 6.5 g. of 4-hydroxypiperidine replacing the piperidine. The crude product is recrystallized from 200 ml. of 2-methoxyethanol to give 7.3 g. of the pure compound melting at 216°–218° C.

EXAMPLE 49

Preparation of 2-[2-(2-Morpholino)ethylamino-5-thiadiazolyl]-1-methyl-5-nitroimidazole The preparation of the above compound is carried out essentially as described for the 2-piperidino derivative in Example 28, 9.0 g. of 2-(2-morpholino)ethylamine replacing the piperidine. The crude product is recrystallized from 125 ml. of 2-methoxyethanol to give 6.4 g. of the pure compound melting at 160°–162° C.

EXAMPLE 50

Preparation of 2-[(1-Imidazolyl)-5-thiadiazolyl]-1-methyl-5-nitroimidazole 2.5 g. of 54.7 percent sodium hydride in mineral oil dispersion is added to a solution of 4.0 g. of imidazole in 300 ml. of dimethylformamide. The mixture is stirred until hydrogen evolution ceases (about one-half hour). 12.3 g. of 2-(2-chloro-5-thiadiazolyl)-1-methyl-5-nitroimidazole is then added and the mixture is then stirred at room temperature for 6 hours. Six hundred ml. of water is added, the precipitate is collected, washed with water, and dried. Recrystallization of the crude product from a mixture of 400 ml. of 2-methoxy-ethanol and 100 ml. of dimethylformamide gives 11.2 g. of the pure compound melting at 251°–252° C., with decomposition.

EXAMPLE 51

Preparation of 2-(2-Diethylamino-5-thiadiazolyl)-1-methyl-5-nitroimidazole

The preparation of the above compound is carried out essentially as described for the 2-piperidino derivative in Example 28, 5.0 g. of diethylamine replacing the piperidine. The crude product is recrystallized from 250 ml. of ethanol to give 6.0 g. of the pure compound melting at 178°–179° C.

EXAMPLE 52

Preparation of 2-[2-(2-Dimethylaminoethyl)amino-5-thiadiazolyl]-1-methyl-5-nitroimidazole The preparation of the title compound is carried out essentially as described for the 2-piperidino derivative in Example 28, 6 g. of 2-dimethylaminoethylamine replacing the piperidine. The crude product is recrystallized from 250 ml. of ethanol to give 3.4 g. of the pure compound melting at 170°–172° C.

EXAMPLE 53

Preparation of 2-[2-(1-Ethyl-3-piperidylamino)-5-thiadiazolyl]-1-methyl-5-nitroimidazole The preparation of the title compound is carried out essentially as described for the 2-piperidino derivative in Example 28, 8.5 g. of 3-amino-1-ethylpiperidine replacing the piperidine. The crude product is recrystallized from isopropanol to give the pure compound melting at 151°–152° C.

EXAMPLE 54

Preparation of 2-[2-(4-Carbethoxy-1-piperazinylacetamido)-5-thiadiazolyl]-1-methyl-5-nitroimidazole 6.0 g. of 2-(2-chloroacetamido-5-thiadiazolyl)-1-methyl-5-nitroimidazole is placed in the thimble of a continuous extraction apparatus, which is attached to a 3-liter round bottom flash with internal stirrer which contains a solution of 4.0 g. of potassium iodide and 7.0 g. of 1-carbethoxy piperazine in one liter of acetone. The mixture is stirred at reflux until all the nitroimidazole derivative is extracted from the thimble (about 20 hours). The acetone is removed under reduced pressure and the residue shaken with 200 ml. of water. The water-insoluble product is collected, dried and recrystallized from 300 ml. of dioxane to give 7.2 g. of pure compound melting at 215°–217° C.

EXAMPLE 55

Utilization of compounds of the present invention in controlling *Trichomonas vaginalis* infections This example demonstrates, employing two modes of administration, the efficacy of 2-(2-amino-5-thiadiazolyl)-1-methyl-5-nitroimidazole against *Trichomonas vaginalis* infections. A. The first mode of administration, hereinafter designated Test A, employs six groups of mice, three groups of five and three groups of 10. The mice are inoculated with 50,000 culture-derived *Trichomonas vaginalis* (Thoms strain). The above compound is thoroughly mixed into ground feed and presented to the mice one day after inoculation. The average ad libitum drug intake, that is milligrams per kilogram of body weight per day, is estimated from the drug diet intake for 5 full days, and mouse weights taken just before and just after treatment. weights taken just before and just after treatment. B. The second mode of administration, hereinafter designated Test B, employs six groups of mice, five groups of 10 and one of five. The mice are inoculated with 50,000 culture-derived *Trichomonas vaginalis* (Thoms strain). The above compound is administered in a single oral dose by gavage one day after inoculation.

Six days post inoculation scrapings, from the subcutaneous sites of inoculation, are searched microscopically for motile trichomonads, and antitrichomonal activity is concluded to be present in those instances where motile trichomonads are eliminated from lesions present at the site of inoculation.

Mouse body weight gain from day 1 to day 6 postinoculation shows that 2-(2-amino-5-thiadiazolyl)-1-methyl-5-nitroimidazole is well tolerated by the animals ingesting same. Furthermore, experimentation demonstrates that more than 1,000 mg. per kilogram of body weight of said compound is well tolerated.

The results of the test are set forth in the following tables:

TEST A

TABLE I

| Compound | Dose* | Total Mice Tested | Cleared | Percentage Cleared |
|---|---|---|---|---|
| 2-(2-amino-5-thiadiazolyl)-1-methyl-5-1 nitroimidazole | 170 mg. | 5 | 5 | 100 |
| | 95 mg. | 5 | 5 | 100 |
| | 90 mg. | 10 | 10 | 100 |
| | 65 mg. | 5 | 4 | 80 |
| | 44 mg. | 10 | 3 | 30 |
| | 10 mg. | 10 | 0 | 0 |

* Dose is in terms of milligrams per kilogram of body weight per day.

TEST B

TABLE II

| Compound | Dose* | Total Mice Tested | Cleared | Percentage Cleared |
|---|---|---|---|---|
| 2-(2-amino-5-thiadiazolyl)-1-methyl-5-nitroimidazole | 100 mg. | 5 | 5 | 100 |
| | 50 mg. | 10 | 10 | 100 |
| | 50 mg. | 10 | 10 | 100 |
| | 25 mg. | 10 | 9 | 90 |
| | 12 mg. | 10 | 7 | 70 |
| | 6 mg. | 10 | 2 | 20 |

* Dose is in terms of milligrams per kilogram of body weight.

C. Female albino mice (ICR strain) were inoculated subcutaneously with approximately 50,000 *Trichomonas vaginalis* (Thoms strain) harvested from a 24 hour culture. The mice were allocated 24 hours postinoculation to 10-mouse test groups, weighed, and subjected to treatment. The present compounds were administered orally; either in the diet for 5 days or in a single gavage dose, and intakes were estimated from average mouse weights, feed intakes, or both. Sham-dosed controls were included in every assay. Six days postinoculation, microscope examination of tissue debris from the lesion at the site of inoculation in untreated mice revealed motile trichomonads. Neither the parasites nor the lesions could be detected in mice which received adequate treatment. In the latter case, saline washings of the sites of inoculation were examined for trichomonads. A regimen was considered active if at least 50 percent of the mice treated harbored no motile trichomonads. The following Table III summarizes the results of the testing.

TEST C
TABLE III

| Compound | Dose mg./kg. [1] No. cleared [2] / No. tested | | | |
|---|---|---|---|---|
| | 100 | 50 | 25 | 12 |
| 2-(2-amino-5-thiadiazoyl)-1-methyl-5-nitroimidazole | 5/5 | 40/40 | 69/70 | 96/110 |
| 2-(2-methylamino-5-thiadiazoyl)-1-methyl-5-nitroimidazole | 10/10 | 5/5 | 23/25 | 13/15 |
| 2-[2-(4-carbethoxy-1-piperazinyl)-5-thiadiazoyl]-1-methyl-5-nitroimidazole | 9/10 | 5/5 | 1/10 | |
| 2-(2-dimethylamino-5-thiadiazoyl)-1-methyl-5-nitroimidazole | | 5/5 | 16/20 | 6/15 |
| 2-[2-[(dimethylaminomethylene)-amino]-5-thiadiazolyl]-1-methyl-5-nitroimidazole | 5/5 | | 18/19 | 10/15 |
| 2-(2-formamido-5-thiadiazoyl)-1-methyl-5-nitroimidazole | 5/5 | | 15/15 | 10/15 |
| 2-(2-amino-5-oxadiazolyl)-1-methyl-5-nitroimidazole | 5/5 | | 6/15 | 1/10 |
| 2-(2-dimethylamino-5-oxadiazoyl)-1-methyl-5-nitroimidazole | 5/5 | 20/20 | 25/25 | 15/25 |
| 2-(2-acetamido-5-oxadiozolyl)-1-methyl-5-nitroimidazole | 20/20 | | 9/20 | 3/20 |
| 2-(2-methylamino-5-oxadiazolyl)-1-methyl-5-nitroimidazole | 10/10 | 4/4 | 10/15 | 10/15 |
| 2-(2-amino-5-thiadiazoyl)-1-ethyl-5-nitroimidazole | 12/15 | 5/5 | 12/15 | 2/10 |
| 2-(2-amino-5-oxadiazolyl)-1-ethyl-5-nitroimidazole | 5/5 | 20/20 | 17/20 | 10/20 |
| 2-(2-amino-5-thiadiazoyl)-1-benzyl-5-nitroimidazole | 12/20 | 5/5 | 0/10 | |
| 2-(2-hydroxymethylamino-5-thiadiazoyl)-1-methyl-5-nitroimidazole | | 20/20 | 19/20 | 7/10 |
| 2-[2-(3-dimethylaminopropylamino)-5-thiadiazoyl]-1-methyl-5-nitroimidazole | 3/5 | | | |
| 2-[2-(hydroxyethylamino)-5-thiadiazoyl]-1-methyl-5-nitroimidazole | 7/10 | 3/5 | 2/5 | 3/5 |
| 2-[2-[N-(2-hydroxyethyl)-methylamino]-5-thiadiazolyl]-1-methyl-5-nitroimidazole | 5/5 | 5/5 | 2/5 | 0/5 |
| 2-[2-(2-morpholinoacetamido)-5-thiadiazolyl]-1-methyl-5-nitroimidazole | 6/10 | 5/10 | 3/10 | 4/10 |
| 2-(2-amino-5-thiadiazolyl)-1-methyl-5-nitro imidazole hydrochloride | 10/10 | | 27/30 | 15/20 |
| 2-(2-ethylamino-5-thiadiazolyl)-1-methyl-5-nitroimidazole | 4/5 | 29/30 | 20/20 | 20/20 |
| 2-[2-[4-(3-dimethylaminopropyl)-1-piperazinyl]-5-thiadiazolyl]-1-methyl-5-nitroimidazole | 18/20 | 2/10 | | |
| 2-[2-(1-piperazinyl)-5-thiadiazolyl]-1-methyl-5-nitroimidazole | | 5/7 | 3/10 | 3/10 |
| 2-[2-[4-(3-dimethylaminopropyl)-1-piperidino]-5-thiadiazolyl]-1-methyl-5-nitroimidazole | 14/14 | 5/10 | 3/10 | |
| 2-[2-(2,2-diethoxyethylamino)-5-thiadiazolyl]-1-methyl-5-nitroimidazole | 7/10 | | | |
| 2-(2-allylamino-5-thiadiazolyl)-1-methyl-5-nitroimidazole | 4/5 | 4/5 | 0/10 | |
| 2-[2-(1-pyrrolidinyl)-5-thiadiazolyl]-1-methyl-5-nitroimidazole | 2/5 | 7/10 | 2/10 | |
| 2-[2-(4-hydroxypiperidino)-5-thiadiazolyl]methyl-5-nitroimidazole | 5/5 | 9/10 | 0/10 | |
| 2-[2-(2-morpholino)-ethylamino-5-thiadiazolyl]-1-methyl-5-nitroimidazole | 5/5 | 9/10 | 4/10 | |
| 2-(2-diethylamino-5-thiadiazolyl)-1-methyl-5-nitroimidazole | | | 5/5 | |
| 2-[2-(2-dimethylaminoethyl)amino-5-thiadiazolyl]-1-methyl-5-nitroimidazole | | | 0/5 | |
| 2-[2-(1-ethyl-3-piperidylamino)-5-thiadiazolyl]-1-methyl-5-nitroimidazole | 5/5 | 4/5 | 12/15 | |
| 2-[2-(4-carbethoxy-1-piperazinylacetamido)-5-thiadiazolyl]-1-methyl-5-nitroimidazole | 4/5 | | 1/5 | |

[1] One dose administered intragastrically 24 hours post-inoculation.
[2] No motile *Trichomonas vaginalis* observed in subcutaneous lesion samples examined five days after treatment.

EXAMPLE 56

Utilization of Compounds of the Present Invention in Controlling Coccidiosis

The anti-coccidial activity of the compounds of the invention is demonstrated by the following tests; 1-day old Peterson cross cockerels of approximately equal size and weight, were divided into groups and the groups placed in separate cages with wire floors. A broiler feed diet of the formulation set forth below and having graded levels of test medicament intimately blended therewith was prepared and administered to the various groups. The formulation used was as follows:

| Formulation | |
|---|---|
| Corn yellow, fine ground | 1200 lbs./ton |
| Soybean, fine ground | 400 |
| Corn gluten meal | 100 |
| Fish meal | 100 |
| Alfalfa meal | 40 |
| Distillers solubles | 50 |
| Mico mix 8009 Limecrest + $M_nSO_4$ | 40 |
| Bone meal (steamed) | 30 |
| NaCl | 10 |
| Chlorine chloride (25%) | 2 |
| Fortafeed (2–49C) | 2 |
|     2 g. riboflavin | |
|     4 g. pantothenic/lb | |
|     9 g. niacin | |
|     10 g. choline | |
| Vitamin A x D, Dry | 2 |
|     2,000 μ/g $D_3$ | |
|     10,000 μ/g A | |
| Profactor—B | 10 mg./ton |

The medicated and unmedicated diets were presented to the chicks and the chicks were permitted to feed and drink ad libitum from 2 days prior until 7 days following the oral inoculation with sporulated oocysts of *Eimeria tenella*. The number of oocysts inoculated directly into the crops of all chicks in the test was sufficient to produce 85–100 percent mortality in the untreated controls. The quantity necessary to produce this mortality rate was determined prior to the time of inoculation by giving graded quantities of oocysts to comparable birds. Seven days following inoculation, the test was terminated and the mortality rate recorded for each group.

The results obtained are provided in Table IV where it can be seen that the compounds of this invention are highly effective as anti-coccidial agents.

TABLE IV

| Structure | Parts per million in diet | Number birds treated | Percent survival |
|---|---|---|---|
| 2-(2-amino-5-thiadiazolyl)-1-methyl-5-nitroimidazole | 0 | 39 | 15 |
| | 125 | 10 | 100 |
| | 60 | 10 | 70 |
| | 30 | 10 | 20 |
| 2-(2-acetamido-5-thiadiazolyl)-1-methyl-5-nitroimidazole | 0 | 20 | 15 |
| | 125 | 10 | 100 |
| | 60 | 10 | 100 |
| 2-(2-methylamino-5-thiadiazolyl)-1-methyl-5-nitroimidazole | 0 | 40 | 12 |
| | 125 | 10 | 100 |
| | 60 | 10 | 90 |
| | 30 | 10 | 60 |
| 2-(2-dimethylamino-5-thiadiazolyl)-methyl-5-nitroimidazole | 0 | 20 | 10 |
| | 125 | 10 | 100 |
| | 60 | 5 | 80 |
| | 30 | 5 | 60 |
| 2-(2-formamido-5-thiadiazolyl)-1-methyl-5-nitroimidazole | 0 | 20 | 15 |
| | 125 | 10 | 100 |
| | 60 | 10 | 80 |
| | 30 | 10 | 40 |
| 2-(amino-5-oxadiazolyl)-1-methyl-5-nitroimidazole | 0 | 20 | 15 |
| | 500 | 5 | 100 |
| 2-(dimethylamino-5-oxadiazolyl)-1-methyl-5-nitroimidazole | 0 | 20 | 40 |
| | 250 | 5 | 100 |
| 2-{2-[(dimethylamino-methylene)amino]-5-thiadiazolyl}-1-methyl-5-nitroimidazole | 0 | 20 | 40 |
| | 125 | 5 | 100 |
| | 60 | 5 | 60 |
| 2-[2-(4-piperazinyl)-5-thiadiazolyl]-1-ethyl-5-nitroimidazole | 0 | 40 | 20 |
| | 125 | 5 | 100 |
| 2-(2-amino-5-thiadiazolyl)-1-ethyl-5-nitroimidazole | 15 | 10 | 100 |
| 2-(2-amino-5-oxadiazolyl)-1-ethyl-5-nitroimidazole | 250 | 5 | 20 |
| 2-(2-amino-5-thiadiazolyl)-1-benzyl-5-nitroimidazole | 250 | 5 | 20 |
| 2-(2-hydroxymethylamino-5-thiadiazolyl)-1-methyl-5-nitroimidazole | 250 | 5 | 100 |
| | 60 | 10 | 70 |
| 2-{2-[N-(2-hydroxyethyl)-methylamino]-5-thiadiazolyl}-1-methyl-5-nitroimidazole | 178 | 5 | 100 |
| | 60 | 5 | 60 |
| 2-(2-morpholinoacetamido-5-thiadiazolyl)-1-methyl-5-nitroimidazole | 125 | 5 | 100 |
| 2-(2-amino-5-thiadiazolyl)-1-methyl-5-nitroimidazole hydrochloride | 60 | 10 | 100 |
| 2-(2-benzylamino-5-thiadiazolyl)-1-methyl-5-nitroimidazole | 60 | 10 | 90 |
| 2-[2-(4-methyl-1-piperazinyl)-5-thiadiazolyl]-1-methyl-5-nitroimidazole | 125 | 5 | 80 |
| 2-{2-[4-(3-dimethylaminoproply)-1-piperazinyl]-5-thiadiazolyl}-1-methyl-5-nitroimidazole | 125 | 5 | 40 |

EXAMPLE 57

Test in mice against *Trypanosoma cruzi*

Tests for chemotherapeutic activity were conducted in (ICR-strain) female mice infected experimentally with B-strain Trypanosoma cruzi. Mice weighing about 18 to 22 grams were inoculated subcutaneously with approximately 100,000 parasites obtained from the blood of donor mice. Treatment in the diet was administered from day 6 through day 12 postinoculation. Infected uninoculated controls were included in each experiment. The criterion of chemotherapeutic activity was prolongation of survival of tested treated mice relative to controls. The results are summarized in the following Table V:

TABLE V

| Compound | Percent diet concentrations, postinoculation | Approximate mg./kg./day | Median survival time, days (treated/controls) | Percent 30 days (treated/controls) |
|---|---|---|---|---|
| 2-[2-(4-carbethoxy-1-piperazinyl)-5-thiadiazol_1]-1-methyl-5-nitroimidazole. | 0.01 | 15 | >30/16 | 90/20 |
| 2-(2-dimethylamino-5-thiadiazolyl)-1-methyl-5-nitroimidazole. | 0.01 | 13 | >30/16 | 70/20 |
| | 0.01 | 12 | >30/14 | 70/0 |
| | 0.005 | 5 | >30/14 | 50/0 |

TABLE V—Continued

| Compound | Percent diet concentrations, postinoculation | Approximate mg./kg./day | Median survival time, days (treated/controls) | Percent 30 days (treated/controls) |
|---|---|---|---|---|
| 2-2-[(dimethylamino-methylene)-amino]-5-thiadiazolyl-1-methyl-5-nitroimidazole. | 0.01 | 15 | >30/17 | 100/40 |
| | 0.01 | 12 | >30/14 | 90/0 |
| | 0.005 | 5 | 16/11 | 40/0 |
| | 0.0025 | 2.7 | 21/14 | 40/0 |
| 2-(2-amino-5-oxadiazolyl)-1-methyl-5-nitroimidazole. | 0.01 | 16 | >30/17 | 100/20 |
| | 0.005 | 7 | >30/17 | 60/0 |
| | 0.0025 | 4 | >30/15 | 50/0 |
| 2-(2-acetamido-5-oxadiazolyl)-1-methyl-5-nitroimidazole. | 0.01 | 12 | >30/16 | 70/20 |
| | 0.01 | 14 | >30/14 | 50/0 |
| | 0.005 | 5 | 19/14 | 30/0 |
| 2-(2-amino-5-thiadiazolyl)-1-(2-hydroxyethyl)-5-nitroimidazole. | 0.01 | 14 | >30/16 | 90/20 |
| 2-(2-amino-5-thiadiazolyl)-1-ethyl-5-nitroimidazole. | 0.01 | 15 | >30/17 | 60/20 |
| 2-[2-(2-morpholino-acetamido)-5-thiadiazolyl]-1-methyl-5-nitroimidazole. | 0.01 | 12 | >30/17 | 50/20 |
| | 0.01 | 11 | >30/14 | 50/0 |
| 2-(2-amino-5-thiadiazolyl)-1-methyl-5-nitroimidazole hydrochloride. | 0.01 | 15 | >30/15 | 60/0 |
| | 0.01 | 12 | >30/18 | 70/0 |
| | 0.0075 | 8 | 22/15 | 30/0 |
| | 0.0075 | 9 | 25/18 | 40/0 |
| | 0.005 | 5 | >30/15 | 50/0 |
| 2-{2-[4-(3-dimethylaminopropyl)-piperazinyl]-5-thiadiazolyl}-1-methyl-1-5-nitroimidazole. | 0.01 | 14 | >30/17 | 70/20 |
| | 0.0025 | 3 | >30/15 | 50/0 |

EXAMPLE 58

Tests to determine intestinal amebiasis in rats

Female weanling rats (Wistar strain from Royalhart Farms) were inoculated intracecally during laparotomy with 100,000 to 200,000 amebas from a 48-hour culture; a method first reported by Jones, 1946, (Ann. Trop. Med. Parasit. 40(2):130 –140.). The rats were divided by random selection into groups with ten animals each; one group remained as the untreated control. Treatment by drug-diet mixture was begun on the day of inoculation and continued for 5 days. The animals were necropsied and examined for infection on the 6th day. The infection was evaluated by assessing the degree of infection for each animal and the average degree of infection, i.e., A.D.I., for each group, using a scoring system similar to that described by Jones, 1946. The per cent of the A.D.I. suppression relative to the untreated control A.D.I. (Abbott's formula) was used to evaluate the activity of candidate compounds. The following Table VI summarizes the results.

TABLE VI

| Compound | Percent drug concentration in diet | Approximate dosage (mg./kg./day) ×5 days | Percent suppression of average degree of infection |
|---|---|---|---|
| 2-(2-amino-5-thiadiazolyl)-1-methyl-5-nitroimidazole | 0.0125 | 17 | 85 (77) |
| 2-(2-acetamido-5-thiadiazolyl)-1-methyl-5-nitroimidazole | 0.025 | 32 | 95 |
| 2-(2-methylamino-5-thiadiazolyl)-1-methyl-5-nitroimidazole | 0.0125 | 17 | 76 |
| 2-[2-(4-carbethoxy-1-piperazinyl)-5-thiadiazolyl]-1-methyl-5-nitroimidazole | 0.05 | 53 | 60 |
| 2-(2-dimethylamino-5-thiadiazolyl)-1-methyl-5-nitroimidazole | 0.05 | 72 | 74 |
| 2-dichloroacetamido-5-(1-methyl-5-nitro-2-imidazolyl)-1,3,4-thiadiazole | 0.05 | 55 | 85 |
| 2-[2-(3-dimethylaminopropylamino)-5-thiadiazolyl]-1-methyl-5-nitroimidazole | 0.05 | 75 | 66 |
| 2-(amino-5-oxadiazolyl)-1-methyl-5-nitroimidazole | 0.05 | 52 | 62 |
| 2-(amino-5-thiadiazolyl)-1-(2-hydroxyethyl)-5-nitroimidazole | 0.006 | 8 | 63 |
| 2-(2-methylamino-5-oxadiazolyl)-1-methyl-5-nitroimidazole | 0.025 | 30 | 57 |

TABLE VI-Continued

| Compound | Percent drug concentration in diet | Approximate dosage (mg./kg./day) ×5 days | Percent suppression of average degree of infection |
|---|---|---|---|
| 2-(2-amino-5-thiadiazolyl)-1-ethyl-5-nitroimidazole | 0.0125 | 16 | 62 |
| 2-(2-amino-5-oxadiazolyl)-1-ethyl-5-nitroimidazole | 0.025 | 34 | 76 |
| 2-(2-amino-5-thiadiazolyl)-1-benzyl-5-nitroimidazole | 0.025 | 24 | 83 |
| 2-(2-hydroxymethylamino-5-thiadiazolyl)-1-methyl-5-nitroimidazole | 0.0125 | 15 (16) | 73 (75) |
| 2-[2-(hydroxyethylamino)-5-thiadiazolyl]-1-methyl-5-nitroimidazole | 0.025 | 35 | 88 |
| 2-[2-[N-(2-hydroxyethyl)methylamino]-5-thiadiazolyl]-1-methyl-5-nitroimidazole | 0.025 | 32 | 70 |
| 2-[2-(2-morpholinoacetamido)-5-thiadiazolyl]-1-methyl-5-nitroimidazole | 0.0125 | 16 | 71 |
| 2-(2-amino-5-thiadiazolyl)-1-methyl-5-nitroimidazole hydrochloride | 0.0125 | 17 | 78 (75) |
| 2-(2-benzylamino-5-thiadiazolyl)-1-methyl-5-nitroimidazole | 0.025 | 26 | 56 |
| 2-(2-ethylamino-5-thiadiazolyl)-1-methyl-5-nitroimidazole | 0.0125 | 22 | 76 |
| 2-(2-cyclohexylamino-5-thiadiazolyl)-1-methyl-5-nitroimidazole | 0.025 | 30 | 79 |
| 2-(2-t-butylamino-5-thiadiazolyl)-1-methyl-5-nitroimidazole | 0.025 | 26 | 61 |
| 2-[2-[4-(3-dimethylaminopropyl)-1-piperazinyl]-5-thiadiazolyl]-1-methyl-5-nitroimidazole | 0.025 | 35 | 100 |
| 2-[2-n-hexylamino-5-thiadiazolyl]-1-methyl-5-nitroimidazole | 0.025 | 32 | 71 |
| 2-(2-piperidino-5-thiadiazolyl)-1-methyl-5-nitroimidazole | 0.025 | 32 | 80 |
| 2-[2-[4-(2-pyridyl)-1-piperazinyl]-5-thiadiazolyl]-1-methyl-5-nitroimidazole | 0.025 | 35 | 58 |
| 2-[2-[4-(2-thiazolyl)-1-piperazinyl]thiadiazolyl]-1-methyl-5-nitroimidazole | 0.025 | 37 | 69 |
| 2-[2-(1-piperazinyl)-5-thiadiazolyl]-1-methyl-5-nitroimidazole | 0.025 | 24 | 77 |
| 2-[4-(2-hydroxyethyl)-piperazinyl-5-thiadiazolyl]-1-methyl-5-nitroimidazole | 0.025 | 35 | 65 |
| 2-[2-[4-(3-dimethylaminopropyl)-piperidino]-5-thiadiazolyl]-1-methyl-5-nitroimidazole | 0.025 | 32 | 60 |
| 2-(2-n-octylamino-5-thiadiazolyl)-1-methyl-5-nitroimidazole | 0.025 | 34 | 100 |
| 2-[2-(2,2-diethoxyethylamino)-5-thiadiazolyl]-1-methyl-5-nitroimidazole | 0.025 | 34 | 89 |
| 2-[2-(1-pyrrolidinyl)-5-thiadiazolyl]-1-methyl-5-nitroimidazole | 0.025 | 32 | 71 |
| 2-[2-(4-hydroxypiperidino)-5-thiadiazolyl]-1-methyl-5-nitroimidazole | 0.025 | 31 | 72 |
| 2-(2-diethylamino-5-thiadiazolyl)-1-methyl-5-nitroimidazole | 0.025 | 34 | 73 |
| 2-[2-(2-dimethylaminoethyl)amino-5-thiadiazolyl]-1-methyl-5-nitroimidazole | 0.025 | 33 | 70 |
| 2-[2-(1-ethyl-3-piperidylamino)-5-thiadiazolyl]-1-methyl-5-nitroimidazole | 0.025 | 31 | 89 |

EXAMPLE 59

Testing of mice against the infection *Trypanosoma equiperidum*

Female albino mice were inoculated intraperitoneally with approximately 100,000 *Trypanosoma equiperdum*. Three to 7 days post-inoculation, untreated animals died. Mice which received active compounds lived longer than the sham-dosed controls or survived until the termination of the assay 14 days post-inoculation. In these experiments, the compounds were administered once, 2 to 4 hours post-inoculation. All dosages were based on average mouse weights obtained just before treatment and were corrected for acid or base content. Regimens which resulted in survival of 50 percent or more of the mice for 14 days postinoculation were considered highly suppressive. Mortality of infected untreated controls in this test is typically greater than 99 percent. The following Table VII summarizes the results of the tests:

TABLE VII

| Compound | Dose No. protected/No. tested |  |  |  |
|---|---|---|---|---|
|  | 80-100 | 40-50 | 20-25 | 10-12 |
| 2-(2-amino-5-thiadiazolyl)-1-methyl-5-nitroimidazole | 10/10 | 6/10 | 5/10 |  |
| 2-(2-methylamino-5-thiadiazolyl)-1-methyl-5-nitroimidazole | 10/10 | 33/40 | 15/30 |  |
| 2-[2-(4-carbethoxy-1-piperazinyl)-5-thiadiazolyl]-1-methyl-5-nitroimidazole |  | 9/10 | 14/20 | 6/10 |
| 2-[2-(3-dimethylaminopropylamino)-5-thiadiazolyl]-1-methyl-5-nitroimidazole |  | 20/20 | 15/15 | 6/15 |
| 2-(2-formamido-5-thiadiazolyl)-1-methyl-5-nitroimidazole |  | 11/20 |  |  |
| 2-(2-amino-5-oxadiazolyl)-1-methyl-5-nitroimidazole | 5/5 | 17/20 |  |  |
| 2-(2-dimethylamino-5-oxadiazolyl)-1-methyl-5-nitroimidazole | 4/5 | 4/10 |  |  |
| 2-(2-amino-5-thiadiazolyl)-1-(2-hydroxyethyl)-5-nitroimidazole | 20/20 | 30/30 | 26/30 | 15/30 |
| 2-(2-methylamino-5-oxadiazolyl)-1-methyl-5-nitroimidazole | 9/10 | 7/10 |  |  |
| 2-(2-amino-5-thiadiazolyl)-1-ethyl-5-nitroimidazole | 4/5 |  |  |  |
| 2-(2-amino-5-thiadiazolyl)-1-(2-acetoxyethyl)-5-nitroimidazole | 5/5 | 5/4 |  |  |
| 2-[2-(hydroxyethylamino)-5-thiadiazolyl]-1-methyl-5-nitroimidazole | 3/5 |  |  |  |
| 2-[2-[N-(2-hydroxyethyl)methylamino]-5-thiadiazolyl]-1-methyl-5-nitroimidazole | 4/5 |  |  |  |
| 2-(2-chloroacetamido-5-thiadiazolyl)-1-methyl-5-nitroimidazole | 1/5 |  |  |  |
| 2-(2-amino-5-thiadiazolyl)-1-methyl-5-nitroimidazole hydrochloride | 55/55 | 62/83 | 24/49 | 15/49 |
| 2-(2-ethylamino-5-thiadiazolyl)-1-methyl-5-nitroimidazole | 9/10 |  |  |  |
| 2-(2-piperidino-5-thiadiazolyl)-1-methyl-5-nitroimidazole | 5/5 | 3/5 |  |  |
| 2-amino-5-[1-(2-hydroxyethyl)-5-nitro-2-imidazolyl]oxadiazole | 4/5 |  |  |  |
| 2-[2-(1-piperazinyl)-5-thiadiazolyl]-1-methyl-5-nitroimidazole | 1/5 |  |  |  |
| 2-[4-(2-hydroxyethyl)-1-piperazinyl-5-thiadiazolyl]-1-methyl-5-nitroimidazole | 5/5 |  |  |  |
| 2-2-[4-(3-dimethylaminopropyl)-1-piperidino]-5-thiadiazolyl-1-methyl-5-nitroimidazole | 4/5 |  |  |  |
| 2-[2-(4-chlorophenylethylamino)-5-thiadiazolyl]-1-methyl-5-nitroimidazole | 2/10 | 0/10 | 2/10 |  |
| 2-[2-(1-pyrrolidinyl)-5-thiadiazolyl]-1-methyl-5-nitroimidazole | 4/5 |  |  |  |
| 2-[2-(4-hydroxypiperidino)-5-thiadiazolyl]-1-methyl-5-nitroimidazole | 5/5 |  |  |  |
| 2-[2-(2-morpholino)-ethylamino-5-thiadiazolyl]-1-methyl-5-nitroimidazole | 5/5 |  |  |  |
| 2-[(1-imidazolyl)-5-thiadiazolyl]-1-methyl-5-nitroimidazole | 1/10 |  |  |  |

EXAMPLE 60

Six female adult patients were treated for 10 days with doses of 250 milligrams three times daily of 2-(2-amino-5-thiadiazolyl)-1-methyl-5-nitroimidazole. This amounted to a total daily dose of approximately 12 mg./kg. The individuals were cultured initially for *T. vaginalis* infection and cultures were repeated on day 6 and on day 11 and a final culture was obtained 3 weeks after treatment. Routine blood chemistry was run on each patient before treatment and repeated on day 6 and day 11. There were no signs of toxicity as reflected in the routine blood chemistry. The results obtained are shown in the following Table VIII:

TABLE VIII

| Patient* | Day 6 of test | Day 11 of test result 24 hours after completed | Three weeks after treatment completed |
|---|---|---|---|
| A | negative | negative | negative |
| B | negative | negative | negative |
| C | negative | negative | **positive |
| D | refused examination | negative | negative |
| E | refused examination | negative | negative |
| F | positive | negative | unavailable |

*All individuals showed positive *T. vaginalis* infection at beginning of test.
** Presumably due to reinfection.

We claim:
1. A method of inhibiting the growth of protozoa in warm-blooded animals which comprises administering orally or parenterally to said animals an antiprotozoally effective amount of a nitroimidazole of the formula:

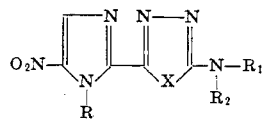

wherein R is selected from the group consisting of lower alkyl, hydroxy lower alkyl, lower alkanoyloxy lower alkyl and benzyl; X is selected from the group consisting of oxygen and sulfur;

taken together is selected from the group consisting of -N = CHN (lower alkyl)$_2$, piperazinyl, N-lower alkylpiperazinyl, N-hydroxy lower alkylpiperazinyl, N-(N',N'-diloweralkylamino)lower alkylpiperazinyl, N-pyridylpiperazinyl, N-thiazolylpiperazinyl, N-lower alkoxycarbonylpiperazinyl; and $R_1$ and $R_2$ when taken individually are selected from the group consisting of hydrogen, benzyl, alkyl of one to eight carbon atoms, halophenyl lower alkyl, allyl, hydroxy lower alkyl, lower alkoxy lower alkyl, cyclohexyl, formyl, lower alkanoyl, monohalolower alkanoyl, dihalolower alkanoyl, 4-lower carbalkoxypiperazinylacetyl, lower alkyl aminolower alkyl and diloweralkyl aminolower alkyl; or physiologically acceptable salts thereof.

2. The method of claim 1, in which the nitroimidazole is 2-(2-amino-5-thiadiazolyl)-1-(2-hydroxyethyl)-5-nitroimidazole.

3. The method of claim 1, wherein the nitroimidazole is 2-(2-amino-5-thiadiazolyl)-1-methyl-5-nitroimidazole.

4. The method of claim 1, wherein the nitroimidazole is 2-(2-methylamino-5-thiadiazolyl)-1-methyl-5-nitroimidazole.

5. The method of claim 1, wherein the nitroimidazole is 2-(2-amino-5-oxadiazolyl)-1-methyl-5-nitroimidazole.

6. The method of claim 1, wherein the nitroimidazole is 2-(2-formamido-5-thiadiazolyl)-1-methyl-5-nitroimidazole.

7. The method of claim 1, wherein the nitroimidazole is 2-(2-amino-5-thiadiazolyl)-1-ethyl-5-nitroimidazole.

8. The method of claim 1, wherein the nitroimidazole is 2-(2-dimethylamino-5-thiadiazolyl)-1-methyl-5-nitroimidazole.

9. A therapeutic composition for the control of protozoa in warm-blooded animals comprising an edible carrier and an effective protozoal controlling amount of a nitroimidazole of the formula:

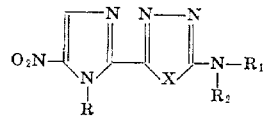

wherein R is selected from the group consisting of lower alkyl, hydroxy lower alkyl, lower alkanoyloxy lower alkyl and benzyl; X is selected from the group consisting of oxygen and sulfur;

taken together is selected from the group consisting of -N = CHN (lower alkyl)$_2$, piperazinyl, N-lower alkylpiperazinyl, N-hydroxy lower alkylpiperazinyl, N-(N',N'-diloweralkylamino)lower alkylpiperazinyl, N-pyridylpiperazinyl, N-thiazolylpiperazinyl, N-lower alkoxy carbonylpiperazinyl; and $R_1$ and $R_2$ when taken individually are selected from the group consisting of hydrogen, benzyl, alkyl of 1 to 8 carbon atoms, halophenyl lower alkyl, allyl, hydroxy lower alkyl, lower alkoxy lower alkyl, cyclohexyl, formyl, lower alkanoyl, monohalolower alkanoyl, dihalolower alkanoyl, 4-lower carbalkoxypiperazinylacetyl, lower alkyl aminolower alkyl and diloweralkyl aminolower alkyl; or physiologically acceptable salts thereof.

10. The therapeutic composition of claim 9, wherein the nitroimidazole is 2-(2-amino-5-thiadiazolyl)-1-methyl-5-nitroimidazole.

* * * * *